US006473956B1

(12) United States Patent
Tucker

(10) Patent No.: US 6,473,956 B1
(45) Date of Patent: Nov. 5, 2002

(54) EXTRACTOR TOOL

(76) Inventor: Richard E. Tucker, 9413 Kennedy Ave., Highland, IN (US) 46322

( * ) Notice: Subject to any disclaimer, the term of this patent is extended or adjusted under 35 U.S.C. 154(b) by 0 days.

(21) Appl. No.: 10/071,610

(22) Filed: Feb. 9, 2002

(51) Int. Cl.[7] .................................................. B23P 19/04

(52) U.S. Cl. ............................. 29/268; 29/270; 29/278; 254/28; 81/418

(58) Field of Search .......................... 29/268, 223, 248, 29/270, 278, 232; 254/18, 28; 81/418, 426.5, 418.5

(56) References Cited

U.S. PATENT DOCUMENTS

| | | | | | |
|---|---|---|---|---|---|
| 650,186 | A | | 5/1900 | Maxson | |
| 826,153 | A | * | 7/1906 | Groff | 81/418 |
| 1,093,400 | A | * | 4/1914 | Gottfrid | 81/418 |
| 1,305,083 | A | | 5/1919 | Fitzgerald | |
| 1,891,164 | A | | 12/1932 | Kluglein | |
| 4,293,119 | A | | 10/1981 | Diederichs | |
| 4,542,669 | A | | 9/1985 | Roux | |
| 4,569,505 | A | | 2/1986 | Braun | |
| 4,574,804 | A | * | 3/1986 | Kurwa | 81/418 |
| 4,709,601 | A | * | 12/1987 | Petersen | 81/418 |
| 5,011,491 | A | | 4/1991 | Boenko | |
| 5,423,236 | A | | 6/1995 | Bicker | |
| 5,497,522 | A | * | 3/1996 | Chen | 7/128 |
| 5,611,519 | A | * | 3/1997 | Garcia | 81/426.5 |

* cited by examiner

*Primary Examiner*—Lee Wilson
(74) *Attorney, Agent, or Firm*—Goldstein & Lavas, P.C.

(57) ABSTRACT

An extractor tool, for removing plastic rivets, anchors, and the like, which have a broad head and a stem, having a proximal end, a distal end, a first part and a second part. Each of the first part and second part have a handle at the distal end, a jaw at the proximal end, and a mid portion therebetween. The first part and second part are pivotally connected at the mid portion and are capable of entering an open position and a closed position. Each jaw is angled upward from the mid portion, has an upper surface, a substantially perpendicular inner surface, and an intermediate portion angled between the upper portion and inner surface. The jaws have intermeshing teeth between the first surface and second surface which meet with substantially no space therebetween when in the closed position. The jaws have a forward portion fully at the distal end which is angled to the more proximal portion of the jaw so that it extends at a substantially ten degree angle to the mid portion.

4 Claims, 5 Drawing Sheets

Fig. 3
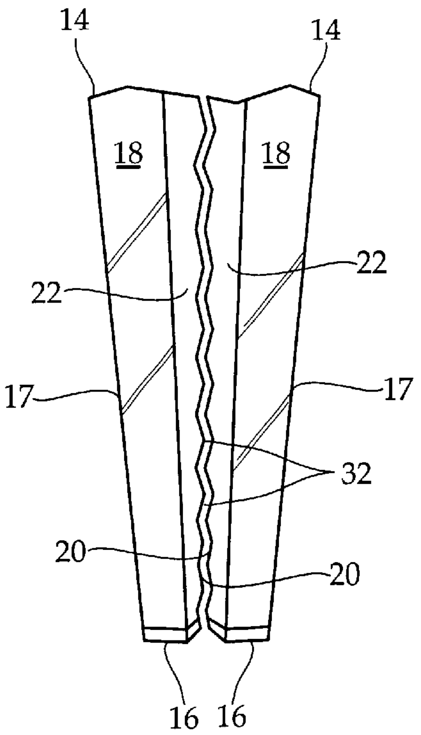
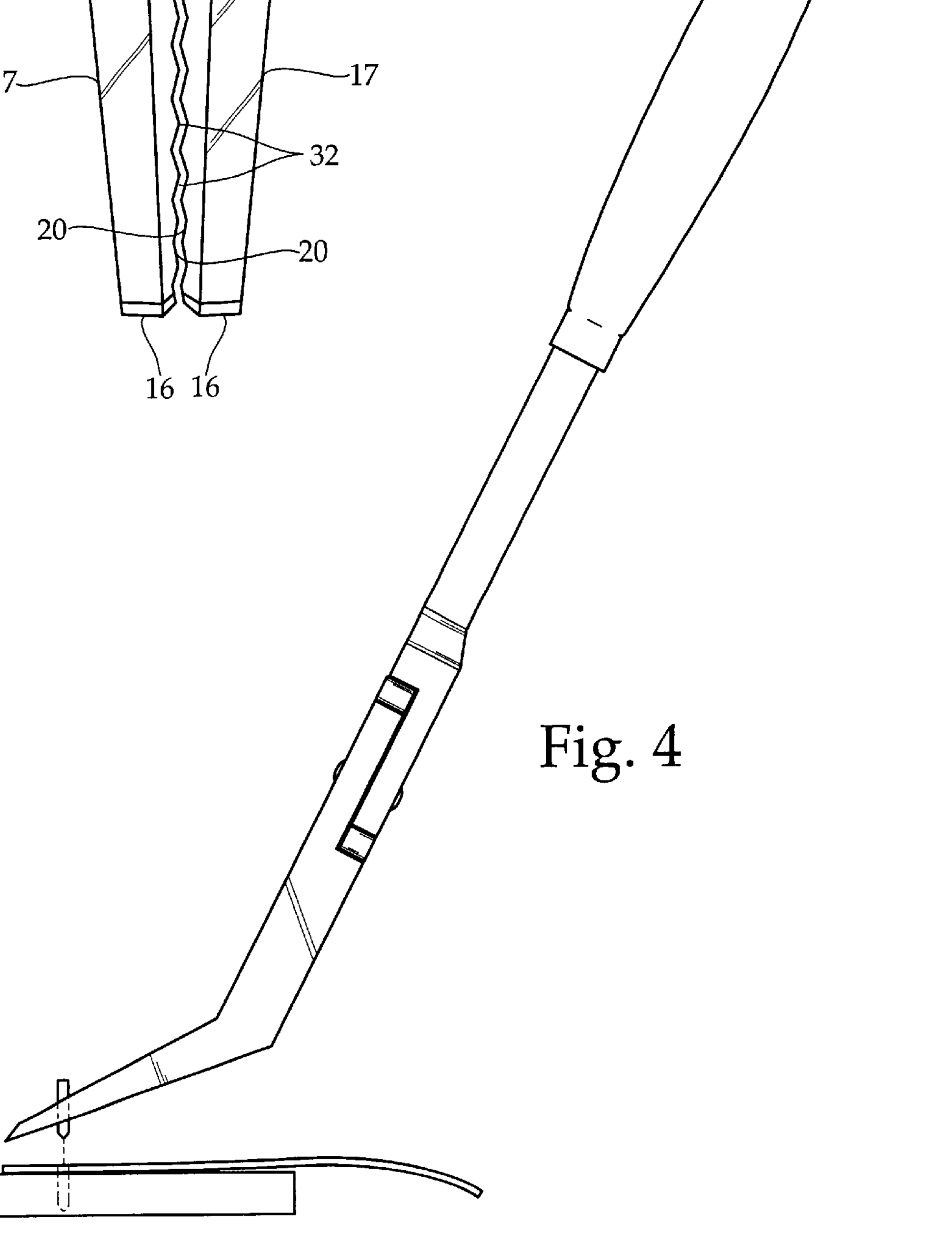
Fig. 4

EXTRACTOR TOOL

BACKGROUND OF THE INVENTION

The invention relates to a extractor tool. More particularly, the invention relates to a tool which is particularly well suited for removing plastic rivets, dry wall anchors, and other items which have a head that is nearly flush with the surface to be removed.

Countless fastening devices are used to secure surfaces together. In particular, bolt and nut arrangements are used for temporary fastening, while rivets are used for permanent fastening.

In certain applications, plastic rivets are used for semi-permanent installations. That is, situations where the connection is intended to be permanent, and cosmetically attractive, but which must sometimes be removed for servicing. Frequently, automotive applications use plastic rivets for the attachment of interior fixtures, carpeting, upholstery, and the like. Such Nylon rivets and buttons often have a broad head which blends easily with a carefully styled interior. However, removal of these rivets, either for replacement of interior panels, upholstery, or headliners —or temporarily while laying wiring—is often difficult. When attempting to use conventional pliers, wrenches, and vice-grips it is common to damage or destroy the plastic rivet, and scratch or mar the surface from which it is being removed.

Conventional pliers fail to have the ability to get under a broad, flush, rivet, with little or no free edge or lip. In this regard, devices have been devised which attempt to aid in the removal of bolts, staples, push pins, and the like. In particular, U.S. Pat. No. 4,293,119 to Diederichs, U.S. Pat. No. 1,891,164 to Kluglein, U.S. Pat. No. 1,305,083 to Fitzgerald, U.S. Pat. No. 4,569,505 to Braun, U.S. Pat, No. 4,542,669 to Roux, U.S. Pat. No. 5,423,236 to Bickler, and U.S. Pat. No. 5,011,491 to Boenko et al. each disclose various attempts at solutions for various fastener removal problems.

U.S. Pat. No. 5,611,519 to Garcia discloses a fastener removal tool which is intended for use in removing headed plastic fasteners. Garcia teaches the importance of a round groove, created by two arcuate grooves in each of the jaws to grab around the stem of the fastener, in the belief that it is better to grab around the stem under the head than the shaft. However, in the case of most plastic rivets, it is better to grasp and compress the stem in order to allow its removal in such a way that the plastic rivet does not break, and can be re-used.

While these units may be suitable for the particular purpose employed, or for general use, they would not be as suitable for the purposes of the present invention as disclosed hereafter.

SUMMARY OF THE INVENTION

It is an object of the invention to provide an extractor device which allows broad headed plastic rivets, anchors, and the like to be easily removed without harming the surface upon which it is mounted. Accordingly, the extractor has a pair of jaws which are configured so as to allow the head to be undermined despite little or no edge or lip.

It is a further object of the invention to provide an extractor device which allows the rivets to be removed without harming them, and thus allows the rivets to be re-used. Accordingly, the jaws have toothed inner surfaces which allow the stem of the rivet to grabbed so that the rivet may be removed in a non-destructive manner.

It is a still further object of the invention to provide an extractor device which is configured to "work" it's way underneath the rivet. Accordingly, the jaws are tapered toward the distal end inward laterally and between the bottom and top surfaces toward the distal end.

The invention is a extractor tool, for removing plastic rivets, anchors, and the like, which have a broad head and a stem, having a proximal end, a distal end, a first part and a second part. Each of the first part and second part have a handle at the distal end, a jaw at the proximal end, and a mid portion therebetween. The first part and second part are pivotally connected at the mid portion and are capable of entering an open position and a closed position. Each jaw is angled upward from the mid portion, has an upper surface, a substantially perpendicular inner surface, and an intermediate portion angled between the upper portion and inner surface. The jaws have intermeshing teeth between the first surface and second surface which meet with substantially no space therebetween when in the closed position. The jaws have a forward portion fully at the distal end which is angled to the more proximal portion of the jaw so that it extends at a substantially ten degree angle to the mid portion.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is an enlarged top plan view of just the jaws.

FIG. 4 is a side elevational view, illustrating the invention in use, removing a pin.

DETAILED DESCRIPTION OF THE PREFERRED EMBODIMENTS

Figure 1:
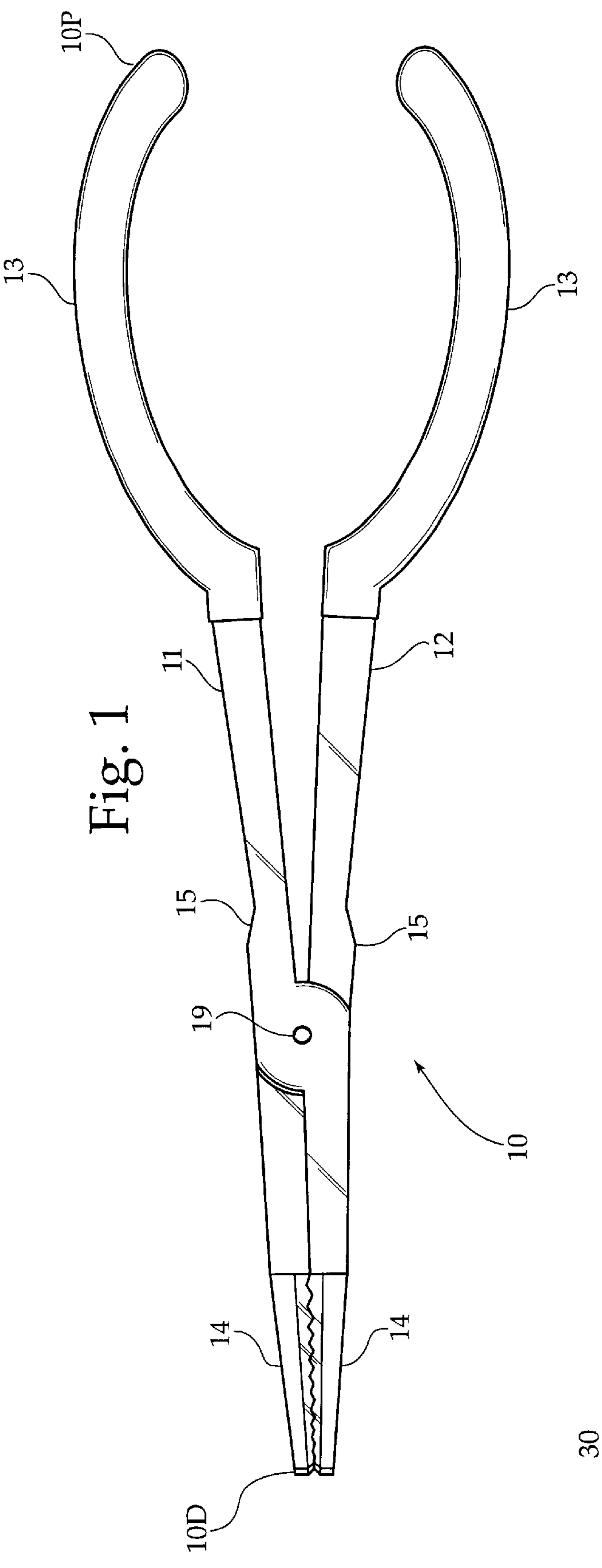
FIG. 1 is a top plan view of the extractor tool according to the present invention.
Figure 2:
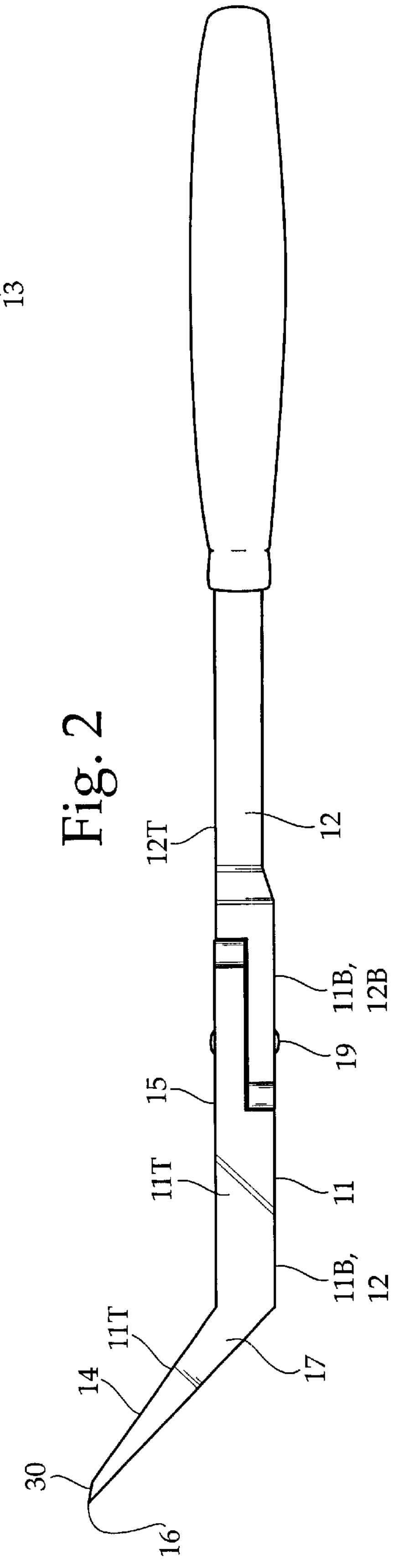
FIG. 2 is a is a side elevational view of the tool.

FIG. 1 illustrates an extractor tool 10 having a proximal end 10P and a distal end 10D, a first part 11 and a second part 12. The first part and second part 12 each have an actuate hand grip 13 at the proximal end 10P, and a jaw 14 at the distal end 10D. The first part 11 and second part 12 each have a top surface 11T and 12T, and a bottom surface 11B and 12B. The first part and second part 12 each have a mid portion 15 between its jaw 14 and hand grip 13. Each jaw has a tip 16 opposite from the mid portion 15. As best seen in FIG. 2, the mid portions 15 are connected together by a pivot pin 19 which extends through both jaws 14 from top to bottom, such that the jaws are connected with a lap joint, such that the first part 11 and second part 12 are substantially coplanar at both the top surface 11T, 12T and bottom surface 11B, 12B. The extractor tool 10 is capable of entering an open position, wherein the jaws 14 are pivoted away from each other, and a closed position 14 wherein the jaws 14 are brought together into closed proximity.

Best referring to FIG. 3, the jaws 14 each have a side surface 17, an upper surface 18, extending from the mid portion to the tip 16, and an inner surface 20, also extending between the mid portion 15 and the tip 16. The inner surface 20 of each jaw extends substantially perpendicular to the upper surface 18, and the inner surfaces of the jaws 14 face each other and meet when the jaws 14 are closed. An intermediate surface 22 extends between the upper surface 18 and inner surface 20 and also extends fully between the mid portion 15 and tip 16. The intermediate surface 22 on each jaw is beveled to form an acute angle between the upper surface 18 and inner surface 20. The intermediate surfaces 22 of both jaws 14 together form a v-shaped valley extending from the mid portion 15 to the tip 16. The side surfaces 17 are angled toward each other toward the tip 16.

When viewed in FIG. 2, it is apparent that the jaws 14 extend at an acute angle from the mid portion 15. In particular, the jaws 15 are bent upward, from the mid portion 15 at both the bottom surface 11B, 12B, and the top surfaces 11T, 12T. In addition, from the side, the jaws 14 are tapered, such that the bottom surfaces 11B, 12B are tapered toward the top surfaces 11T, 12T. However, at the tip 16, the top surfaces 11T and 12T are angled downward from the top surfaces 11T, 12T, to create a forward portion 30 which directly adjoins the tip 16 and is the most distal portion of the tip 16. At the top surfaces 11T and 12T, the tip 16 extends nearly parallel to the top surface of the mid portion 15. "Nearly" parallel is more correct a term, because in fact, it is preferred that the top surface of the forward portion 30 extends at a ten (10) degree angle to the mid portion 15.

Referring to FIG. 3, the inner surfaces 20 meet with a shallow toothed pattern, having a plurality of interlaced teeth 32. The teeth 32 are arranged so that when the extractor 10 is closed, the teeth engage each other with substantially no gaps therebetween. The teeth 32 allow cylindrical portions of the workpiece to be securely grasped, while distributing the force of the jaws upon that workpiece to the greatest extent possible. Grasping a workpiece between jaws at a single point creates the greatest possibility of crushing the workpiece.

The teeth 32 of each jaw 14 have a diminishing tooth depth, which may be defined as the vertical distance on the inner surface 20 between the intermediate portion and the bottom surface 11B or 12B. The tooth depth diminishes consistent with how the jaw tapers down in thickness toward the tip 16 as seen in FIG. 4. The diminishing width of the intermediate surface 22, helps illustrate that the intermediate surface varies in angle with respect to the upper surface, such that the angle formed between the intermediate surface 22 and upper surface becomes steeper toward the tip 16.

Figure 5:
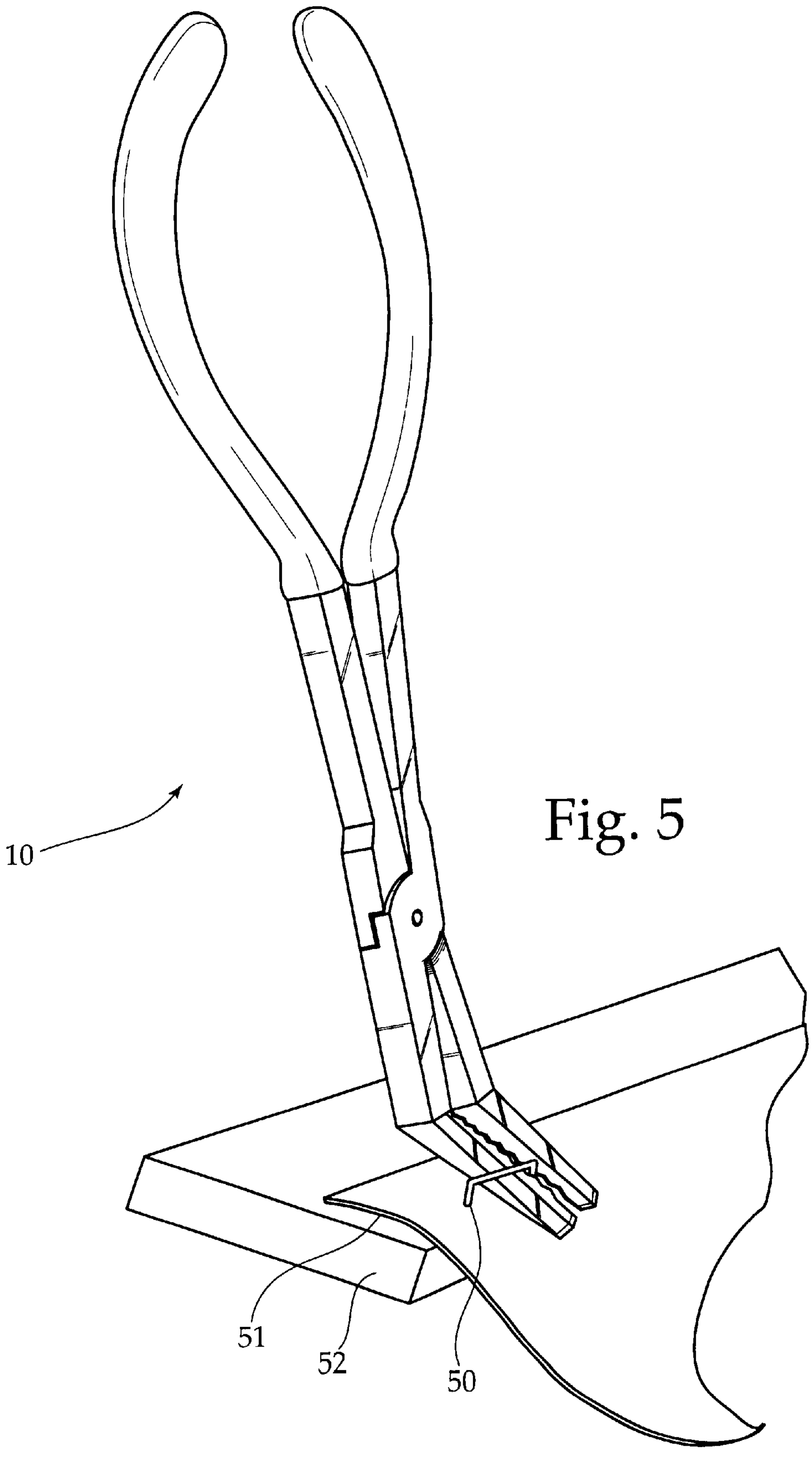
FIG. 5 is a side elevational view, illustrating the invention in use, removing a staple.
Figure 6:
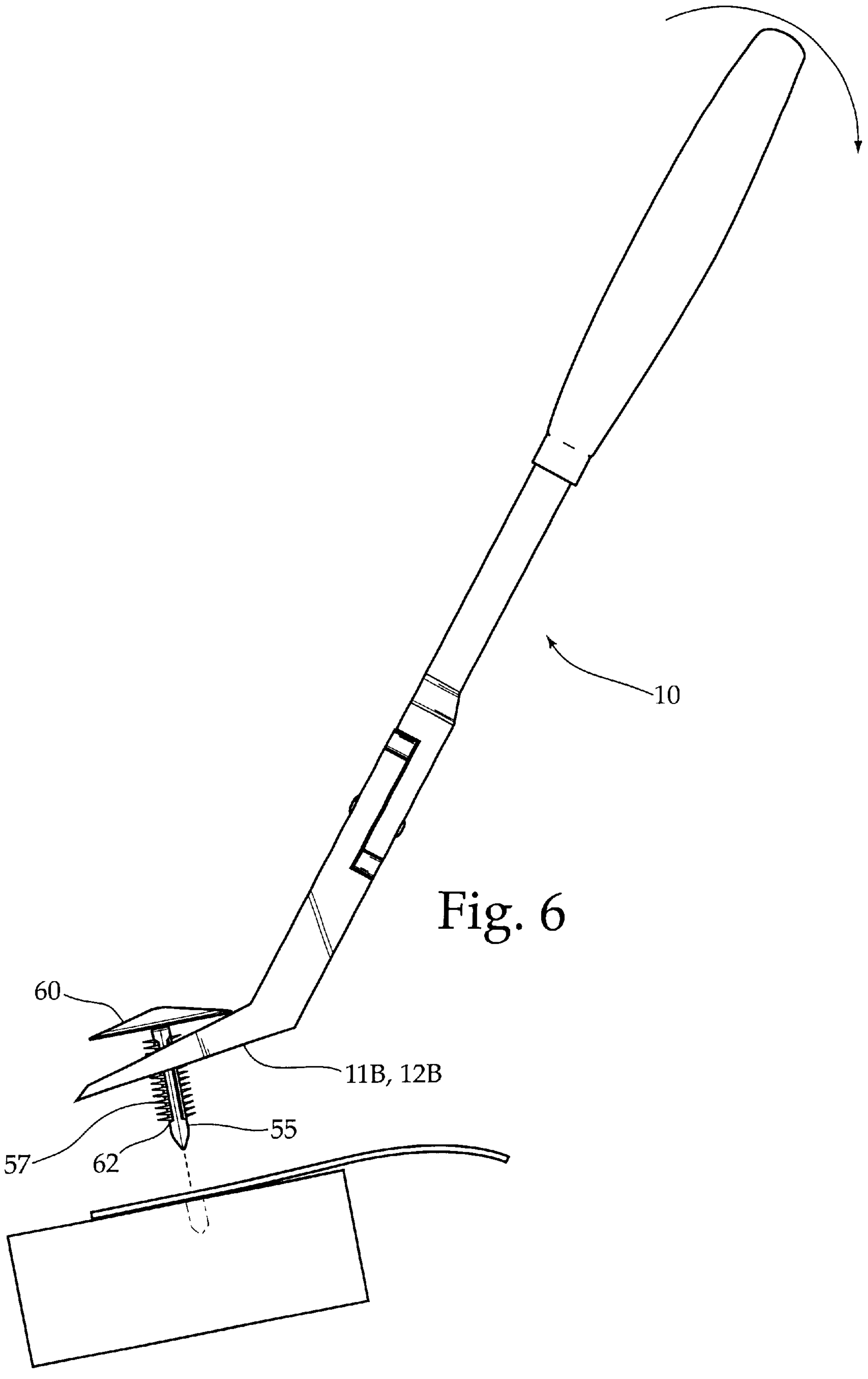
FIG. 6 is a side elevational view, illustrating the invention in use, removing a plastic rivet.
Figure 7:
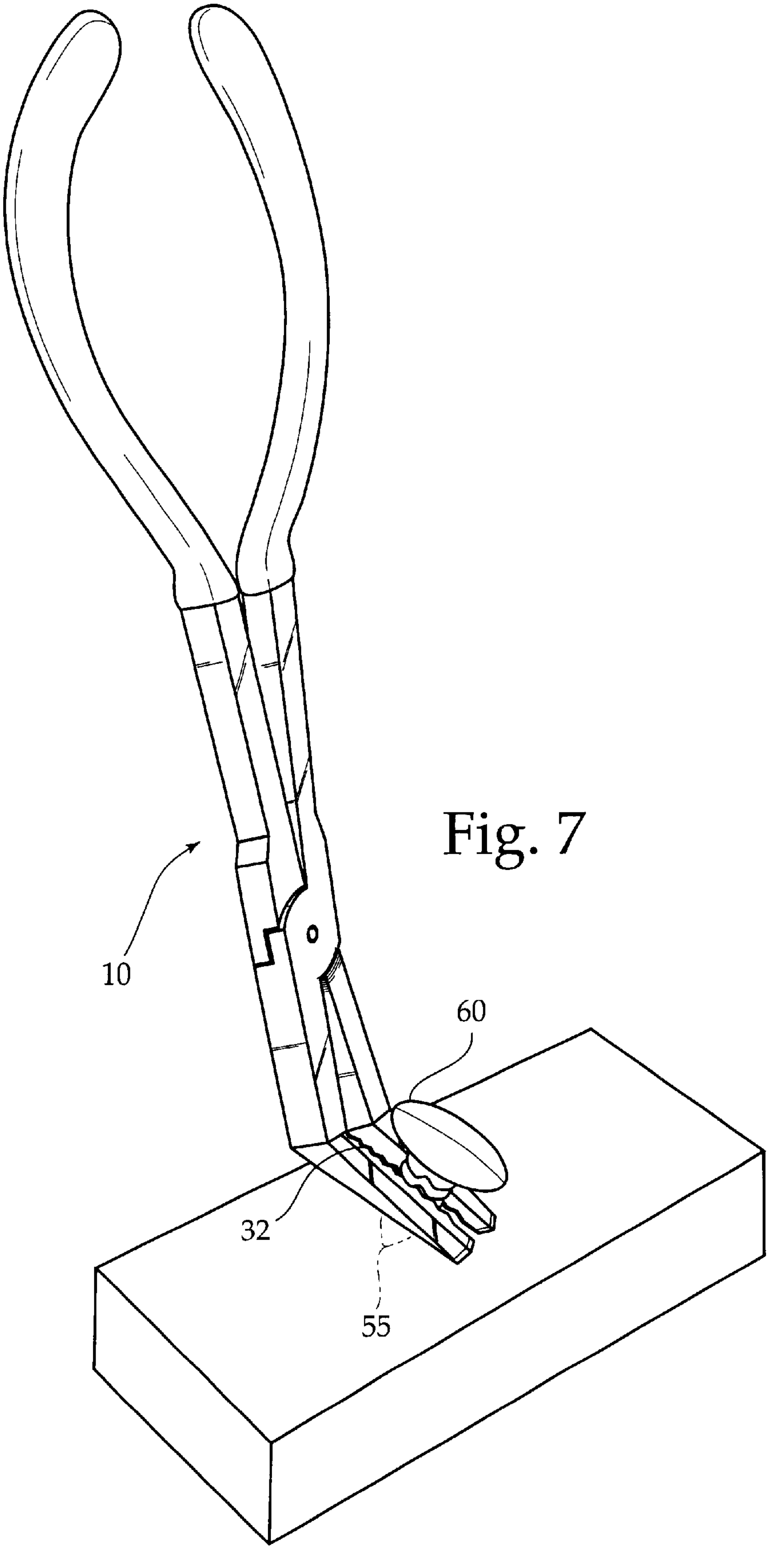
FIG. 7 is a side elevational view, illustrating the invention in use, removing another type of plastic rivet.

FIG. 5 illustrates the extractor 10 being used to remove a staple 50 which connects a pair of surfaces 51 and 52. FIG. 6 and FIG. 7 illustrate the extractor 10 being used to remove a plastic rivet 55 without harming the underlying surface—in part, the smooth bottom 11B and 12B helps prevent damage thereto. In particular, the plastic rivet 55 has a broad head 60 and a stem 62. The broad head 60 resists most tools, in that is provides very little "lip" or side surface to help undermine the head. Accordingly, the various adaptations of the extractor, including the beveled forward surfaces, help undermine the broad head 60, and allow the stem 62 to be grasped. The stem 62 is grasped within the teeth 32, which can help remove the plastic rivet 55 safely, and so that it can be used again. In particular, many of these plastic rivets 55 have various adaptations 57 which expand within the recipient hole to anchor therein. Accordingly, carefully compressing such adaptations allows the plastic rivet 55, or similar anchoring device, to be removed in a non-destructive way.

In conclusion, herein is presented an extractor tool, which allows plastic rivets, anchors, and the like to be easily removed from a surface without damaging the surface. The invention is illustrated by example in the drawing figures, and throughout the written description. It should be understood that numerous variations are possible, while adhering to the inventive concept. Such variations are contemplated as being a part of the present invention.

What is claimed is:

1. An extractor tool, comprising:

a proximal end and a distal end;

a first part and a second part, each having a top and bottom, the first part and second part each having a handle at the proximal end, and each having a jaw at the distal end, and a mid portion between the handle and jaw, the first part and second part are connected with a lap joint such that a pivot pin extends through the first part and second part from the top to the bottom, so that the extractor is capable of entering an open position wherein the jaws are pivoted apart and a closed position wherein the jaws are brought close together;

each jaw extends at an acute angle from the mid portion at both the bottom surfaces and the top surfaces of the first and second parts, each jaw has an upper surface, an inner surface extending perpendicular to the upper surface, and an intermediate surface angled between and connecting the upper surface and inner surface, the inner surfaces of the jaws face each other and adjoin when the extractor is closed, each jaw having a forward surface furthest distally thereon, the forward surface angled with respect to the more proximal portions of the jaw at an acute angle, the bottom of the jaw angled toward the top of the jaw toward the tip, the sides of the jaw angled toward each other toward the tip;

wherein the inner surfaces of the jaw have intermeshing teeth such that when in the closed position, the teeth leave substantially no gaps therebetween; and wherein the upper surfaces extend substantially between the mid portions and tip, the inner surface extends substantially between the mid portions and tips, the intermediate portion extends substantially between the mid surface and tips, and wherein the intermediate portions of the jaws form a v-shaped valley between the mid surface and the tips.

2. The extractor tool as recited in claim 1, wherein the forward surface is angled to the more proximal portions of the jaw such that the forward surface forms a substantially ten degree angle with the mid portion.

3. The extractor tool as recited in claim 1, wherein the bottom of the jaws are angled toward the top of the jaws, extending toward the tip.

4. The extractor tool as recited in claim 2, wherein the intermediate portion diminishes in width from the mid portion toward the tip.

* * * * *